United States Patent Office 3,021,296
Patented Feb. 13, 1962

3,021,296
COMPOSITIONS AND FILMS COMPRISING POLY-
ETHYLENE AND N,N'-ETHYLENE BIS OLEAM-
IDE AND PROCESS OF PRODUCING SAME
Clayton J. Ammondson, Tinley Park, Ill., assignor to
Union Carbide Corporation, a corporation of New
York
No Drawing. Filed July 1, 1959, Ser. No. 824,204
10 Claims. (Cl. 260—32.6)

This invention relates to improvements in the slip and non-blocking properties of self-supporting polyethylene films and the like.

Self-supporting polyethylene films exhibit poor slip, i.e., do not slide readily over each other, which in turn results in poor handling characteristics. The poor slip behavior of the films interferes with their use in automatic processing equipment since the film must pass freely through the fabricating machine (e.g., heat sealer, bag maker, bag loader or filler, bag opener, overwrap package) for it to operate properly and reproducibly.

Another disadvantage of polyethylene films is their tendency to block, that is, to resist separation by a separating force applied perpendicular to the film as by a simple lifting action. This phenomenon also results in poor handling characteristics.

During the extrusion of polyethylene by the blown-tube extrusion technique to form tubular film layflat, blocking occurs at the nip rolls used to retain the inflating gas within the tube, particularly when extruding at high rates. The temperature of the tubular film entering the nip rolls is frequently high enough to cause the film layers to stick or adhere to each other. While this source of blocking can be eliminated by reducing the extrusion rate, this is economically undesirable.

In practice, film layers are normally separated by a combination of sliding and lifting forces. The lifting component is resisted by blocking forces and the sliding component is resisted by frictional forces. Blocking can be determined by measuring the perpendicular force required to separate one film layer from another. Slip can be determined by measuring the film's kinetic coefficient of friction as determined by the stationary sled-sliding film method. The blocking and sliding or slip forces are theoretically at right angles to each other.

The incorporation of various fatty acid amides in small quantities has been proposed to reduce the blocking of polyethylene film and to lower its coefficient of friction. While amides such as oleamide, stearamide, and the like have some beneficial effect in improving polyethylene, particularly in film form, their use is attended by a number of serious disadvantages.

A major disadvantage of these prior art amides occurs during the storing of polyethylene films containing the same at somewhat elevated temperatures. Under such storage conditions these films show an increased tendency to block, and slip characteristics are also adversely affected subsequent thereto.

Another disadvantage of such previously proposed amides stems from their unduly rapid "sweat-out" or exudation to the polyethylene surface and their excessive volatility. The amide exudate is particularly troublesome in the production of polyethylene film by the tubular extrusion process employing internal cooling formers or mandrels for shaping and sizing the film. The amide deposits on the surface of these forms and creates a drag on the films which causes film stretching and other film irregularities and even tearing of the film. This deposition appears to be caused in part by a mechanical wiping-off of the exudate from the film surface onto the former or mandrel and in part by volatilization of the amide followed by condensation onto the cold surface. Similar difficulties are encountered during polyethylene coating, particularly extrusion coating operations and the like wherein amide deposition occurs on the chill roll and causes surface imperfections in the polyethylene which render the products unacceptable.

Another disadvantage associated with rapid, premature "sweat-out" of these amides is over-lubrication of the film surface during the film manufacturing process, such that the film when reeled up directly from the extruder or other film-forming apparatus is too slippery to form a tightly wound reel.

The relatively high volatility of these amides makes them of little to no value when the composition is extruded in film form at high temperatures, that is, at about 200° C. and higher, which are required in the extrusion coating of smooth-surfaced substrates, such as metal foils, to insure satisfactory adhesion, or in flat film extrusion to attain maximum film clarity. The excessive volatility of these amides at such high extrusion temperatures makes it difficult to insure the presence of proper and effective concentrations of the amide in the final product.

It is accordingly an object of this invention to provide a polyethylene film composition having improved anti-blocking and slip characteristics. A further object is to provide a polyethylene film composition wherein film made therefrom has improved slip and anti-blocking characteristics and wherein other physical properties of the film, such as clarity, permeability, sealability, printability, etc., are substantially unaffected. Other and additional objects will become apparent from the description of the invention hereinafter set forth.

According to this invention there is provided a novel film composition consisting essentially of a film-forming polyethylene and a small amount of N,N'ethylene bis oleamide.

It has been found that the homogeneous addition of small quantities of N,N'ethylene bis oleamide to the polyethylene prior to film extrusion results in films having improved slip and non-blocking characteristics and minimum exudation of said amide. Upon storage of the instant polyethylene film composition even after it is subjected to elevated temperatures, as in uninsulated warehouses during the summer months the slip and anti-blocking characteristics are much improved over those of unmodified polyethylene.

A process for the preparation of N,N'ethylene bis oleamide is described in "Chemical Abstracts," 22, 4130 (1928) by reference to German Patent 464,142 of July 26, 1928.

The polyethylene compositions of the present invention are preferably prepared by any suitable method yielding a substantially uniform mixture of the components. Uniform mixtures can be obtained by mixing the polyethylene with the N,N'ethylene bis oleamide on a conventional rubber mill or in a Banbury mixer at a temperature at which the polyethylene becomes plastic. After a substantially homogeneous mixture is obtained, the composition is removed from the mill or mixer, cooled and ground into particles of a size suitable for extrusion.

Those in the art will readily appreciate that other methods can also be effectively used to obtain the desired compositions, such as dry blending the components, making a concentrate of the N,N'ethylene bis oleamide and polyethylene and thereafter blending the concentrate with sufficient additional polyethylene to result in the final desired composition.

The proportions of the components in the composition are important. Too small a quantity of the N,N'ethylene bis oleamide will not improve the slip properties of the polyethylene film. In general, at least 0.01 percent N,N'ethylene bis oleamide by weight of polyethylene must be incorporated into the composition to achieve any significant improvement in properties. Amounts in excess of 0.5 percent do not further significantly improve the slip and blocking characteristics of the polyethylene film. However, when the film is to be imprinted, it is preferred to maintain the concentration below about 0.25 percent. Concentrations above 0.25 percent show impaired printability. Concentrations of from about 0.05 to 0.2 percent are preferred.

The compositions are composed essentially of a film-forming polyethylene and N,N'ethylene bis oleamide. Other components such as lubricants, antistatic agents, antioxidants, coloring matter, and the like can be added to the composition, provided, however, that the amount added is insufficient to substantially alter the slip and anti-blocking properties of the composition.

The principles of this invention are applicable to all film-forming, melt-extrudable polyethylenes, and particularly those having a density up to 0.94 at 20° C. and a melt index between 0.1 and 20.

It is to be noted that when film is made from the composition of this invention, the full effect of the improvement in slip characteristics obtained by the incorporation of N,N'ethylene bis oleamide into polyethylene is not fully evident until about 10 days to two weeks after film has been made when the film is stored at room temperature (i.e. about 20°–25° C.). Heating the film or storing the film at elevated temperatures will reduce the time appreciably.

Table I below shows the results obtained by measuring the slip or force necessary to overcome the sliding friction between like sheets of unmodified polyethylene and of polyethylene modified with N,N'-ethylene bis oleamide according to the invention after exposure to elevated temperatures of 150° F.

The slip is measured as the force in grams required to slide 4.5 square inches of film over another film of the same composition at a rate of 24 inches per minute and under a weight load of 240 grams in sliding contact. The improvement in the slip characteristics subsequent to the heating in the modified polyethylene is clearly evident from the table:

TABLE I

|  | Storage Time at 150° F in Minutes | | | |
| --- | --- | --- | --- | --- |
|  | 0 | 1 | 2 | 5 |
|  | Slip in Grams | | | |
| Unmodified polyethylene | 303 |  |  | 314 |
| Polyethylene modified with 0.1% N,N'ethylene bis oleamide | 275 | 265 | 285 | 194 |

The slip characteristics of the polyethylene modified with the N,N'ethylene bis oleamide either remain substantially uniform or improve during storage at elevated temperatures. This is in contrast to a film made from a polyethylene-oleamide composition of the prior art which show definite impairment in slip characteristics when stored at elevated temperatures.

An additional advantage gained from using this invention is that the blocking of thin film made from the compositions of this invention is substantially unaffected during storage at elevated temperatures, whereas the blocking of the above-mentioned prior art compositions is very adversely affected.

The polyethylene compositions of the instant invention are particularly adaptable for melt extrusion into tubing films, sheets, etc., and can also be used for coating onto plastics, metal, paper, cloth, glass, and the like.

In the preferred form of the invention, seamless flattened tubing is obtained by melt extruding the composition by the "blown tube" process of U.S. Patent 2,461,975. When sheeting is desired, the tubing can be longitudinally slit. Sheeting can also be made by calendering or by slot extrusion.

The invention is particularly suitable for the production of film having thicknesses of from 0.5 to 5 mils.

The invention will be more readily understood from the following examples wherein parts and percentages are by weight.

*Examples*

Comparative data are shown in the examples for unmodified polyethylene, polyethylene modified with oleamide, and polyethylene modified with N,N'ethylene bis oleamide according to the invention. The indicated percentages of oleamide (melting point ca. 76° C.) and N,N'ethylene bis oleamide (melting point ca. 80° C.) were incorporated into a film-forming polyethylene having a melt index of 2.0, a softening point of 112° C., and a density of 0.922. A concentrate of polyethylene and the respective amide was prepared by milling the ingredients on a heated two-roll mill at a temperature of about 240° F. for about 20 minutes until homogeneous and then cooled and ground to a particle size suitable for extrusion. The desired compositions were then prepared by dry blending the concentrate with additional polyethylene to produce the final compositions.

The compositions were extruded into tubing by the blown-tube method, using standard extrusion equipment.

The samples tested were stored at the indicated temperatures and for the indicated periods of time while under a weight load of 1.5 lbs. per square inch.

The blocking value is measured as the perpendicular force in grams required to separate 16 square inches of film from a film of the same composition while applying an increasing separating force of 10 grams per minute.

The method for measuring slip was the same as that used in obtaining the data for Table I.

Tables II and III show the resulting slip and blocking values for samples containing the indicated amounts of amide stored at 120° F. and 149° F. respectively.

The length of storage time is indicated and the samples were under a weight load of 1.5 lbs. per square inch.

TABLE II

| Additive | Blocking (Grams) | | | | Slip (Grams) | | | |
| --- | --- | --- | --- | --- | --- | --- | --- | --- |
|  | Initial at Room Temp. | Storage at 120° F. | | | Initial at Room Temp. | Storage at 120° F. | | |
|  |  | 2 wks. | 4 wks. | 8 wks. |  | 2 wks. | 4 wks. | 8 wks. |
| Control (no additive) | 68 | 104 | 110 | 100 | >300 | 222 | 283 | 280 |
| 0.03% Oleamide | 72 | 120 | 123 | 114 | 113 | 158 | 250 | >300 |
| 0.05% Oleamide | 75 | 109 | 119 | 109 | 58 | 95 | 183 | >300 |
| 0.10% Oleamide | 75 | 98 | 109 | 114 | 40 | 62 | >300 | >300 |
| 0.15% Oleamide | 76 | 99 | 108 | 107 | 30 | 55 | >300 | >300 |
| 0.25% Oleamide | 74 | 91 | 87 | 93 | 27 | 47 | >300 | >300 |
| 0.03% N,N'ethylene bis oleamide | 68 | 87 | 90 | 82 | 268 | 83 | 98 | 136 |
| 0.05% N,N'ethylene bis oleamide | 70 | 94 | 93 | 88 | 248 | 62 | 55 | 58 |
| 0.10% N,N'ethylene bis oleamide | 71 | 87 | 97 | 83 | 176 | 48 | 43 | 50 |
| 0.15% N,N'ethylene bis oleamide | 71 | 95 | 93 | 88 | 143 | 42 | 42 | 47 |
| 0.25% N,N'ethylene bis oleamide | 73 | 90 | 89 | 81 | 93 | 33 | 47 | 53 |

TABLE III

| Additive | Blocking (Grams) | | | | Slip (Grams) | | | |
| --- | --- | --- | --- | --- | --- | --- | --- | --- |
| | Initial at Room Temp. | Storage at 120° F. | | | Initial at Room Temp. | Storage at 120° F. | | |
| | | 2 wks. | 4 wks. | 8 wks. | | 2 wks. | 4 wks. | 8 wks. |
| Control | 68 | 125 | 127 | 115 | >300 | 223 | 280 | >300 |
| 0.03% Oleamide | 72 | 134 | 137 | 123 | 113 | 217 | >300 | >300 |
| 0.05% Oleamide | 75 | 137 | 140 | 119 | 58 | 197 | >300 | >300 |
| 0.10% Oleamide | 75 | 125 | 135 | 128 | 40 | >300 | >300 | >300 |
| 0.15% Oleamide | 76 | 107 | 129 | 121 | 30 | >300 | >300 | >300 |
| 0.25% Oleamide | 74 | 95 | 118 | 116 | 27 | >300 | >300 | >300 |
| 0.03% N,N'ethylene bis oleamide | 68 | 94 | 100 | 105 | 268 | 118 | 138 | 187 |
| 0.05% N,N'ethylene bis oleamide | 70 | 95 | 98 | 98 | 248 | 67 | 60 | 88 |
| 0.10% N,N'ethylene bis oleamide | 71 | 94 | 96 | 88 | 176 | 45 | 42 | 47 |
| 0.15% N,N'ethylene bis oleamide | 71 | 96 | 100 | 82 | 143 | 47 | 38 | 42 |
| 0.25% N,N'ethylene bis oleamide | 73 | 97 | 107 | 86 | 93 | 45 | 45 | 47 |

In obtaining data for the above tables, a slip value of 300 grams was the upper limit that the apparatus could measure accurately. Samples marked >300 resisted sliding movement at this maximum load.

As may be seen from Table II, the polyethylene modified with oleamide and the N,N'ethylene bis oleamide of the invention have substantially equivalent slip and blocking values after storage at room temperature. The data of Tables II and III clearly show the improved slip and anti-blocking characteristics of the compositions of the instant invention at elevated temperatures. As stated previously, temperatures of 120° F. or higher are often encountered in warehouses during summer months, especially in the warmer climates. The advantages of the instant invention over prior art oleamide modifiers are obvious where such temperatures are encountered.

In addition to the above advantages, polyethylene modified with N,N'ethylene bis oleamide has acceptable printability, sealability, clarity, and permeability.

What is claimed is:

1. A process for improving the slip and anti-blocking characteristics of self-supporting polyethylene films which comprises forming a homogeneous mixture of a film-forming polyethylene and an anti-blocking amount of at least 0.01 percent by weight thereof of N,N'ethylene bis oleamide to polyethylene and melt extruding said mixture into films.

2. A process for improving the slip and anti-blocking characteristics of polyethylene films which comprises forming a homogeneous mixture of a film-forming polyethylene and between about 0.01 and 0.5 percent by weight thereof of N,N'ethylene bis oleamide and melt extruding said mixture into film.

3. A self-supporting plastic film having improved slip and anti-blocking characteristics consisting essentially of a film-forming polyethylene and an anti-blocking amount of at least 0.01 percent by weight of N,N'ethylene bis oleamide.

4. A self-supporting plastic film having improved slip and anti-blocking characteristics consisting essentially of film-forming polyethylene and between about 0.01 and 0.5 percent by weight of N,N'ethylene bis oleamide.

5. A self-supporting plastic film having improved slip and anti-blocking characteristics and good printability consisting essentially of film-forming polyethylene and between about 0.05 and 0.2 percent by weight of N,N'ethylene bis oleamide.

6. A composition for melt extrusion into a self-supporting film having good elevated temperature slip and anti-blocking characteristics comprising a film-forming polyethylene and an anti-blocking amount of at least 0.01 percent by weight of N,N'ethylene bis oleamide.

7. A composition for melt extrusion into a self-supporting film having good elevated temperature slip and anti-blocking characteristics consisting essentially of a film-forming polyethylene and between about 0.01 and 0.5 percent by weight of N,N'ethylene bis oleamide.

8. A composition for melt extrusion into a self-supporting film having good elevated temperature slip and anti-blocking characteristics and good printability consisting essentially of a film-forming polyethylene and between about 0.05 and 0.25 percent by weight of N,N'ethylene bis oleamide.

9. A melt-extrudable, self-supporting film-forming composition comprising essentially a homogeneous mixture of a film-forming polyethylene having a density of up to 0.940 at 20° C. and melt index between 0.1 and 20, and of N,N'ethylene bis oleamide in an anti-blocking amount of at least 0.01 percent by weight of the film-forming polyethylene.

10. A process for improving the slip and anti-blocking characteristics of polyethylene films which comprises forming a homogeneous mixture of a film-forming polyethylene and between about 0.01 and 0.25 percent by weight thereof of N,N'ethylene bis oleamide and melt extruding said mixture into film.

References Cited in the file of this patent
UNITED STATES PATENTS 2,464,855    Duggan et al. _____ Mar. 22, 1949

FOREIGN PATENTS 1,132,791    France _____ Mar. 15, 1957
464,142    Germany _____ Aug. 10, 1928